July 31, 1928.

J. H. JOHNSON

FOOD PRESERVING CABINET

Filed Sept. 25, 1924

INVENTOR
JOHN H. JOHNSON
BY
ATTORNEY

July 31, 1928.  1,678,730

J. H. JOHNSON

FOOD PRESERVING CABINET

Filed Sept. 25, 1924  4 Sheets-Sheet 2

INVENTOR
John H. Johnson
By
Attorney

July 31, 1928.

J. H. JOHNSON 1,678,730

FOOD PRESERVING CABINET

Filed Sept. 25, 1924        4 Sheets-Sheet 3

INVENTOR
JOHN H. JOHNSON
BY
*Bruce Cabinham*
ATTORNEY

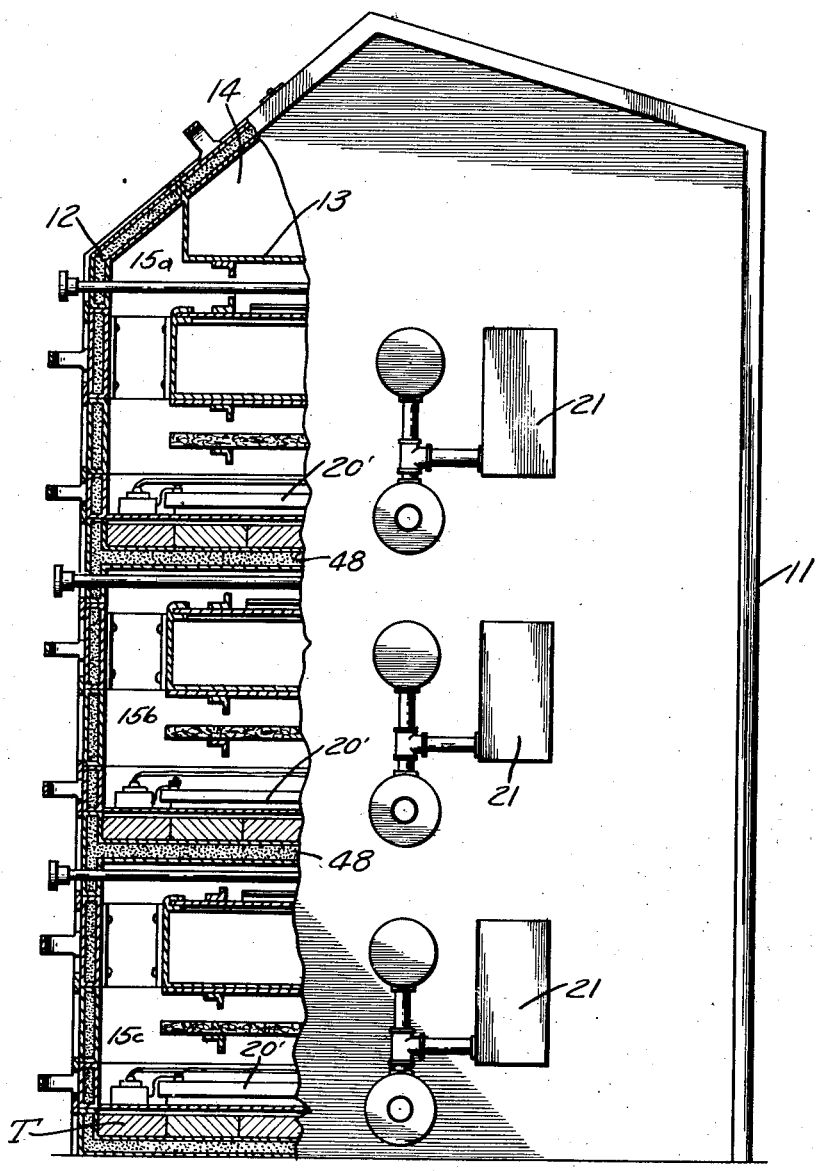

Patented July 31, 1928.

1,678,730

UNITED STATES PATENT OFFICE.

JOHN H. JOHNSON, OF SANTA BARBARA, CALIFORNIA.

FOOD-PRESERVING CABINET.

Application filed September 25, 1924. Serial No. 739,957.

My present invention is a food preserving cabinet; and it is a primary object of this invention to provide a cabinet suitable both for the display of cafeteria goods, or the like, and for the keeping of the same, even during comparatively long periods of time and in a fresh and palatable condition.

It is a further object of this invention to provide a cabinet of the general character referred to in which separate compartments, which may be of the drawer type, are provided and arranged in such manner that each is separately controllable and movable and capable of being opened without disturbing the contents or condition of another compartment.

It is a further object of this invention to provide a cabinet some or all of whose compartments may be equipped with devices permitting independent adjustment of outlet openings for the escape of moisture or the introduction of limited quantities of dry hot air thereto, if desired; and, in certain advantageous embodiments of my invention, means may optionally be provided permitting either the maintenance of a substantially uniform predetermined temperature throughout all compartments or, alternatively, the maintenance of a different temperature in each compartment; and the organization last referred to may even be arranged to permit an actual cooking or baking in one or more compartments while a very much lower temperature is maintained in another compartment or compartments,—the waste heat escaping from the cooking or baking compartment being thus very economically utilized.

Very serious losses are, and have long been, incurred by bakers and dealers in bakery products, and the like, as well as by those who serve such products, in consequence of a heretofore seemingly unavoidable deterioration thereof; and the mentioned losses are in a large part due to the fact that the trade demands that certain products be "fresh" in the sense that they must be both hot and moist. When products such as biscuits are kept hot they have heretofore suffered undue loss of moisture; and when they are kept moist, as by the use of steam or external application of water, there has been a consequent tendency toward early sogginess or toughness, often followed by a mustiness rendering the same unattractive or unfit for human consumption. It is an object of my invention to obviate, or materially reduce, the losses just referred to, and to provide, for this purpose, a complete organization comprising electrical heating means under thermostatic control.

Other objects of my invention will appear from the following description of alternative embodiments thereof, taken in connection with the appended claims and the accompanying drawings, in which Fig. 1 is a side elevation, with parts broken away to a substantially central plane.

Fig. 5 is a side elevational view corresponding to Fig. 1, but showing an alternative construction in which provision is made for heating separate drawers or compartments to different temperatures.

Figure 1:
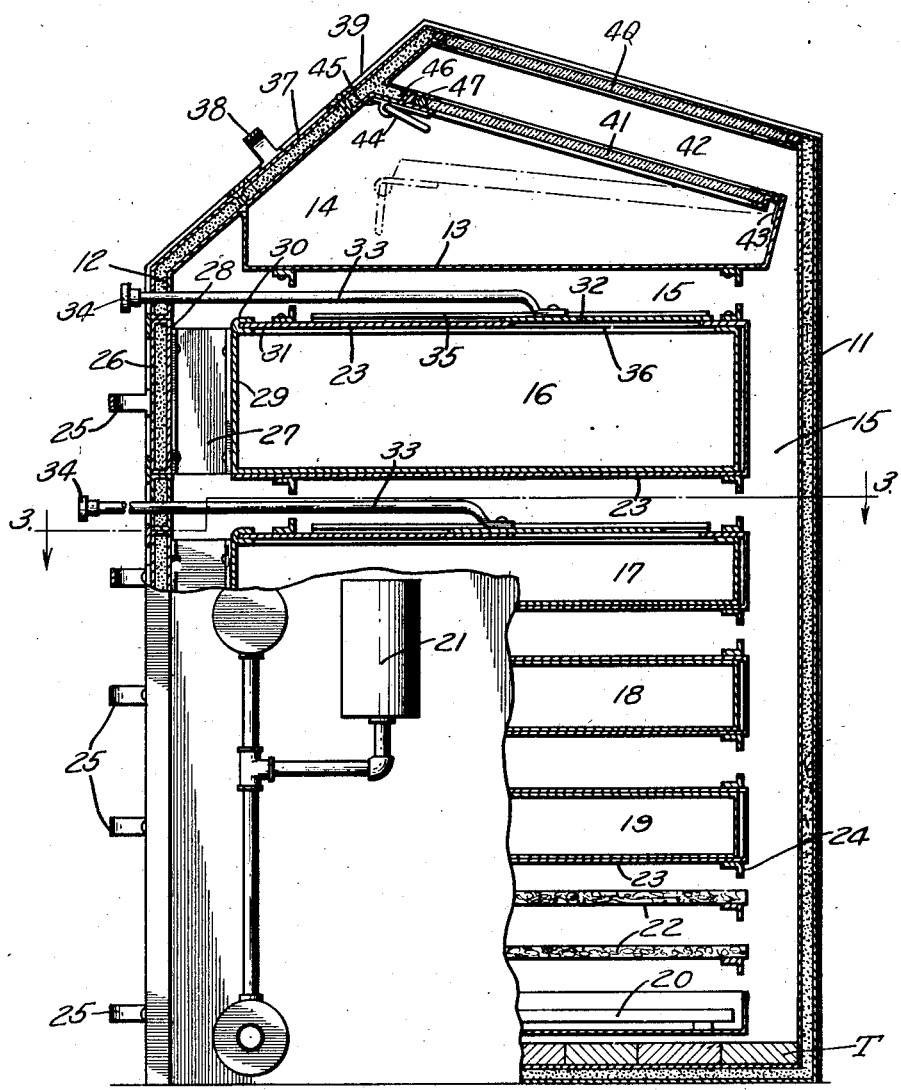
Figure 2:
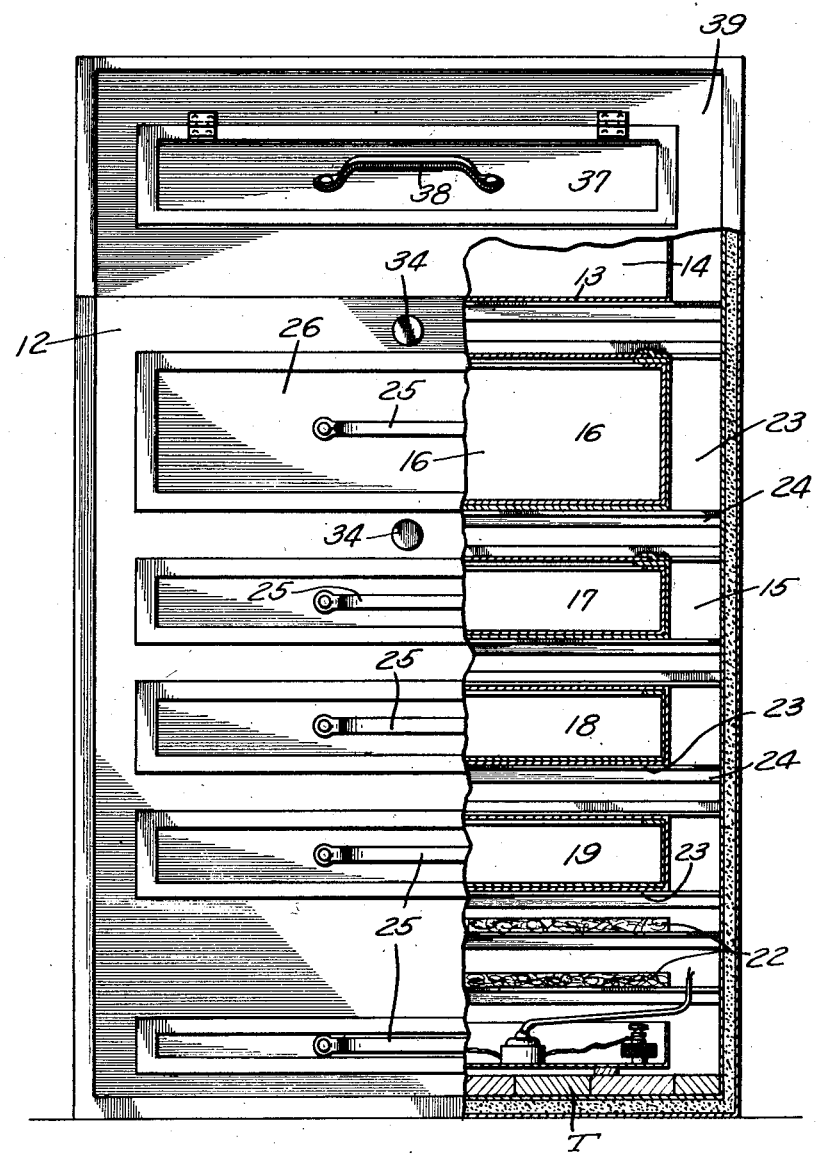
Fig. 2 is a front elevation, with parts broken away.
Figure 3:
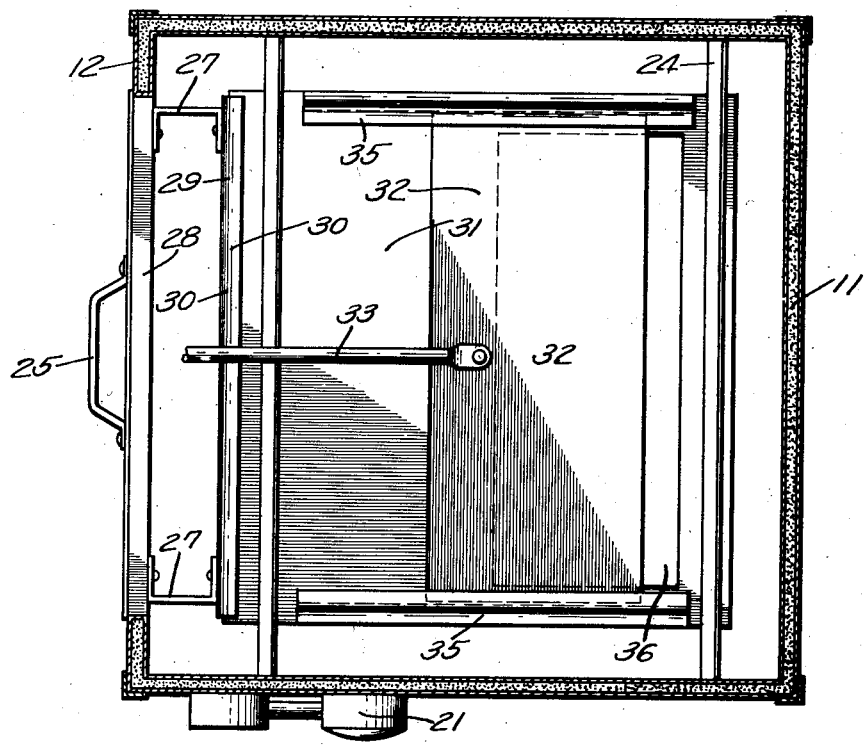
Fig. 3 is a horizontal section, taken substantially as indicated by the line 3—3 of Fig. 1.
Figure 4:
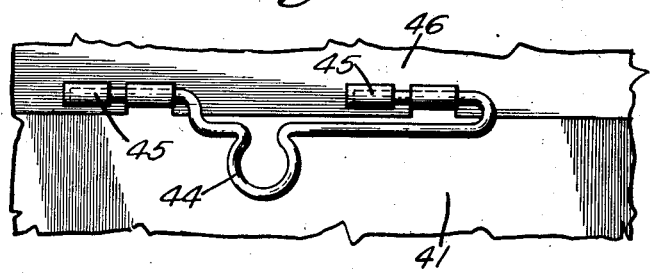
Fig. 4 is a detail view showing a preferred type of latch for an interior door, as hereinafter described.

Referring to the details of that specific embodiment of my invention illustrated in Figs. 1 to 4 inclusive, 11 and 12 may be the double walls of a cabinet especially designed for cafeteria use, the interior of the cabinet being shown as subdivided by a transverse partition 13 in such manner as to form an exhibition compartment or display section 14, distinct from a main chamber or drawer section 15, within which separate containers such as drawers 16, 17, 18 and 19 may be independently movable. At any suitable point in the drawer section 15, as at 20, in the bottom thereof, I may provide suitable heating means, such as an electrical resistance, and this may be under automatic control, as by means comprising an external thermostatic organization conventionally indicated at 21. Air heated by the electrical resistance 20, or its equivalent, and optionally baffled by means such as the asbestos plates 22, may be permitted to rise freely about the exteriors of the mentioned drawers, or about housings 23 within which the same are adapted to slide, these housings being in turn rigidly supported, as by means of angle irons 24, in such manner as to permit a free circulation of heated air entirely about the same. In order to permit passage of heated air in front of the mentioned drawers, while permitting their manipulation by means such as the handles 25, shown as secured to the external plates 26 of outwardly movable sections of the front wall, I may employ means such as spacers 27 formed of channel iron, or the like, secured respectively to the inner walls 28 of the mentioned movable sections and to the front walls 29 of the respective drawers. To avoid an unintended escape of moisture therefrom when the mentioned drawers are closed, I may provide the upper edge of the front walls 29 thereof with a horizontally extending slot 30, adapted to receive the front edge of the top 31 of the housing 23; and in order to permit a regulated escape of moisture from any drawer, when such an escape is desired, by reason of the nature of the particular food contained therein, I may employ means such as a slide 32, shown as movable laterally by a rod 33 connected with an external knob or handle 34, the inner end of said rod being shown as secured to the slide 32, for which a guide 35 may be provided, this slide being movable relatively to an opening 36 in the upper wall 31 of the housing 23.

Each compartment or drawer of a cabinet may contain a different food product, and the requirements of the respective products may be met by variations in adjustment of the slides 32; and those products from which no moisture should be permitted avoidably to escape may be confined in drawers or compartments, 18, 19, provided or unprovided with such slides.

Although the display section 14, heated by circulated air, may be used for any desired purpose, I suggest the employment of the same in the exhibition of suitable samples of each of the products contained in the respective drawers; and in order to facilitate free inspection of such samples, I may provide not only a pivoted door 37, having a handle 38. and arranged in a self-closing manner in an inclined upper surface 39, but also double windows 40, 41, defining an air space 42, into which hot air may rise. The inner window 41 may advantageously be pivoted as at 43, and provided with a latch 44, capable of engagement, as by a sliding movement, with keepers 45, provided upon the lower surface of a ledge 46, preferably provided with a diagonal face 47, or with other means serving as a stop for said door,—the pivoting of this window being intended primarily to facilitate the cleaning of the inner surface of both the window 40 and the window 41.

In the form of my invention illustrated in Fig. 5, instead of providing a single main chamber or drawer section, I show the space below the partition 13 as subdivided into a plurality of like chambers, 15$^a$, 15$^b$, and 15$^c$, each of these chambers being provided with a separate heating means 20′, controlled by a separate thermostatic device 21′, the mentioned chambers being rendered practically independent by interposition of insulating double walled partitions 48 therebetween. Other features of the organization illustrated in Fig. 5 may be substantially similar to those shown in the preceding figures; and it will be understood that, in any embodiment of my invention, I may employ any desired number of separate drawers or other compartments, associating the same either above one another or side by side and providing independent heating means and independent means for controlling the escape of moisture from the separate compartments, as may be required. A general organization of the character illustrated in Fig. 5 is especially suitable when widely different temperatures are wanted in the different compartments, as when actual cooking is to be done in one compartment, and a lower temperature or temperatures, or high percentages of moisture, are to be maintained in an adjacent compartment or compartments.

In either or any embodiment of my invention, I may secure effects comparable to those which might be obtained in a vacuum or thermos receptacle, provided with no vent, and I may use one compartment to keep hard rolls hard even while I use another compartment to keep soft rolls soft, the contents of both compartments being preserved at an elevated temperature, the admission of dry air or the escape of steam being under complete control independently of the temperature. The heating elements may be connected with any light socket or any power line, and they may be rendered conveniently accessible by supporting the same, as shown, in drawers, movable relatively to a fixed "floor" or to the bottom of my cabinet, and each "floor" thereof may optionally be double and provided with tiles of the same general character as those shown at T near the bottom of Fig. 2.

Food on display can be kept in an attractive and palatable condition ready for immediate and convenient delivery; and even foods that have been permitted to cool may be promptly restored to substantially their original condition, either by placing them in one of the drawers or by supporting them upon the partition 13, provided only with bottom heat. Articles that are ordinarily deemed suitable for consumption only within a few minutes after their delivery from an oven may, by the described means, be preserved in a fresh condition for periods of 24 to 36 hours, or even longer.

Although I have herein described complete embodiments of my invention, it will be understood that various features thereof might be independently employed and also that various modifications might be made by those skilled in the art, without the slightest departure from the spirit and scope of my invention, as the same is indicated above and in the following claims.

In a sense, my invention may be regarded as involving a preserving process which is the exact opposite of refrigeration; and I desire to especially emphasize the fact that although all compartments may optionally be provided with means for regulating the escape of moisture, no form of my invention makes any provision for an introduction of steam or water under any condition, the only moisture present in any case being that which is natural and appropriate to the food in question, in its fresh condition; and the foregoing observations are true, not only in the cafeteria style of cabinet, above described, but also in such an embodiment as might be called a combined toaster and preserver, or in such an embodiment as may be adapted to incorporation in an electric range, or even in such embodiments as may replace certain show cases and certain serving tables, many of the more elaborate embodiments of my invention being adapted to supplant the common steam tables, although operating upon a principle totally distinct therefrom.

I claim as my invention:

1. A food preserving cabinet comprising insulating walls, a lower section with drawers spaced from the sides to form air-circulation flues, a slidable cover for each drawer, a transverse partition forming a display section above the drawer section, and a heater within the cabinet.

2. A food preserving cabinet comprising insulating walls, a lower section with drawers spaced from the sides to form air-circulation flues, a slidable cover for each drawer, a transverse partition forming a display section above the drawer section, a heater within the bottom of the cabinet, and said display section being provided with a double glazed inspection opening.

3. A food preserving cabinet comprising insulating walls, a lower section with drawers spaced from the sides to form air-circulation flues, a slidable cover for each drawer, a transverse partition forming a display section above the drawer section, a heater within the bottom of the cabinet, and said display section being provided with a double glazed inspection opening comprising a fixed plate of transparent material and a pivoted plate of like material.

4. A food preserving cabinet comprising insulating walls, a lower section with drawers spaced from the sides to form air-circulation flues, a slidable cover for each drawer, a transverse partition forming a display section above the drawer section, a heater within the bottom of the cabinet, and said display section being provided with a double glazed inspection opening comprising a fixed plate of transparent material and a pivoted plate of like material, the pivot plate being inside the fixed plate.

5. A food preserving cabinet comprising insulating walls, a lower section with drawers spaced from the sides to form air-circulation flues, a slidable cover for each drawer, a transverse partition forming a display section above the drawer section, a heater within the bottom of the cabinet, and said display section being provided with a window in one inclined surface thereof and with a door in an oppositely inclined surface thereof.

6. A food preserving cabinet comprising insulating walls, a lower section with drawers spaced from the sides to form air circulation flues, a slidable cover for each drawer, a transverse partition forming a display section above the drawer section, a heater within the cabinet, and means exteriorly of the cabinet for independently operating the covers for said drawers.

In testimony whereof, I have hereunto set my hand at Santa Barbara, California, this 19th day of Sept., 1924.

JOHN H. JOHNSON.